(12) United States Patent
McMurtrey

(10) Patent No.: US 10,232,870 B2
(45) Date of Patent: Mar. 19, 2019

(54) BRACKET AND CASTER LIFT FOR SHOPPING CART

(71) Applicant: Unarco Industries LLC, Wagoner, OK (US)

(72) Inventor: Wesley McMurtrey, Bixby, OK (US)

(73) Assignee: Unarco Industries LLC, Wagoner, OK (US)

( * ) Notice: Subject to any disclaimer, the term of this patent is extended or adjusted under 35 U.S.C. 154(b) by 0 days.

(21) Appl. No.: 15/424,220

(22) Filed: Feb. 3, 2017

(65) Prior Publication Data

US 2018/0222509 A1    Aug. 9, 2018

(51) Int. Cl.
*B62B 3/14* (2006.01)
*B62B 3/18* (2006.01)

(52) U.S. Cl.
CPC .......... *B62B 3/1472* (2013.01); *B62B 3/1404* (2013.01); *B62B 3/1436* (2013.01); *B62B 3/1496* (2013.01); *B62B 3/144* (2013.01); *B62B 3/182* (2013.01)

(58) Field of Classification Search
CPC ........ B62B 3/14; B62B 3/1404; B62B 3/1472
See application file for complete search history.

(56) References Cited

U.S. PATENT DOCUMENTS

| | | | |
|---|---|---|---|
| 3,015,494 A * | 1/1962 | Fosbrook, Sr. ....... | B62B 3/1404 254/131 |
| 6,923,456 B2 * | 8/2005 | Ryan ..................... | B62B 3/1404 280/33.991 |
| 7,673,886 B2 * | 3/2010 | Ondrasik .............. | B62B 3/1404 280/33.991 |
| D628,759 S | 12/2010 | Walter | |
| D654,242 S * | 2/2012 | Berthiaume .................. | D34/27 |
| D698,114 S * | 1/2014 | Smith ........................... | D34/21 |
| 9,302,692 B2 * | 4/2016 | Smith .................. | B62B 3/1404 |
| 9,371,084 B2 * | 6/2016 | Peters ..................... | B62B 3/027 |
| 9,457,827 B2 * | 10/2016 | Peters ...................... | B62B 3/14 |
| 9,598,096 B2 * | 3/2017 | Smith ................... | B62B 3/1404 |
| D796,144 S | 8/2017 | Lazzarino et al. | |
| 9,815,486 B2 * | 11/2017 | McMurtrey ........... | B62B 5/0006 |

(Continued)

FOREIGN PATENT DOCUMENTS

CN         102616262 A        8/2012

OTHER PUBLICATIONS

Aug. 7, 2018—(WO) International Search Report & Written Opinion—App PCT/US2018/016585.

*Primary Examiner* — Jacob B Meyer
(74) *Attorney, Agent, or Firm* — Banner & Witcoff, Ltd.

(57) ABSTRACT

A bracket assembly includes a bracket for attachment to a shopping cart and a cover connected to the bracket and covering at least part of the bracket. The bracket includes a metal plate having first and second faces, where the length is greater than the width, and the width is greater than the thickness. The bracket has a projection extending outward from the first face and a recess extending inward from the second face and corresponding to the projection. The cover has two walls and a cavity defined between the walls, and the bracket is received within the cavity such that the first and second faces each confront one of the walls. The cover further has a slot in at least one wall, such that the cover is press-fit on the bracket and the projection is received in the slot to retain the cover in connection with the bracket.

25 Claims, 15 Drawing Sheets

(56) References Cited

U.S. PATENT DOCUMENTS

| | | | |
|---|---|---|---|
| 2006/0049590 A1* | 3/2006 | O'Quin | B62B 3/14 |
| | | | 280/33.991 |
| 2006/0273535 A1* | 12/2006 | O'Quin | B62B 3/14 |
| | | | 280/33.991 |
| 2008/0265534 A1* | 10/2008 | Ondrasik | B62B 3/1404 |
| | | | 280/33.991 |
| 2012/0049539 A1* | 3/2012 | Sanvik | B62B 3/1404 |
| | | | 290/1 R |
| 2013/0255036 A1 | 10/2013 | McMurtrey | |
| 2014/0159327 A1* | 6/2014 | Smith | B62B 3/14 |
| | | | 280/33.991 |
| 2014/0353935 A1* | 12/2014 | Smith | B62B 3/1404 |
| | | | 280/33.997 |
| 2015/0053652 A1 | 2/2015 | Peters et al. | |
| 2015/0053688 A1 | 2/2015 | Peters et al. | |
| 2015/0054237 A1* | 2/2015 | Peters | B62B 3/14 |
| | | | 280/33.997 |
| 2016/0280245 A1* | 9/2016 | Smith | B62B 3/1404 |
| 2017/0036686 A1* | 2/2017 | Peters | B62B 3/14 |

* cited by examiner

BRACKET AND CASTER LIFT FOR SHOPPING CART

FIELD OF THE INVENTION

This disclosure relates to nestable shopping carts for grocery stores and the like, and more specifically to bracket installed in such shopping carts that can function as a support for the basket of the cart and/or a caster lift for cart nesting, which bracket may include a cover or other connected piece to assist in the caster lift function.

BACKGROUND

History and lore teach that the shopping cart was invented by Oklahoman Sylvan Goldman, for his grocery store business, the one that became over time Unarco Industries, LLC, the assignee of this disclosure. At present, the American-market, adult, full-size, wire-made shopping cart has a distinctive construction of a frame, casters, basket, hinged back gate and child seat. For more historical information, see the following: Unarco Company History, Unarco Industries LLC, currently found at http://www.unarco.com/history.html; and for more allegedly historically accurate information, Shopping Cart, currently found at http://en.wikipedia.org/wiki/Shopping cart; Smithsonian's History Explorer, History of the Shopping Cart, currently found at http://amhistory.si.edu/thinkfinity/podcast/shoppingcart.m4a. See as well the following patents and patent publications: U.S. Pat. No. 2,155,896, inventor Sylvan Goldman (original shopping cart); U.S. Pat. No. 2,662,775, inventor same; and U.S. Pat. No. 2,769,645, inventor same (folding child seat with hinged back gate). For more current information, see U.S. Pat. No. 7,090,230 issued Aug. 15, 2006, inventor O'Quin, assignee Unarco; U.S. Patent Publication No. US 2014/0159327 published Jun. 12, 2014, on a Shopping Cart, inventors Smith and McMurtrey, assignee Unarco, especially at FIGS. 2-3; U.S. Patent Publication No. US 2013/0307239 published Nov. 21, 2013, on a Shopping Cart and Method of Assembling Same, inventors Smith and McMurtrey, assignee Unarco, especially at its background; and "Manufacturing Shopping Trolleys," https://www.youtube.com/watch?v=u5hwY1s0O0M, uploaded according to YouTube Apr. 12, 2008.

The following pending patent applications are incorporated by reference in full as if fully set forth in this disclosure: U.S. application Ser. No. 14/098,744, filed Dec. 6, 2013, inventors Smith and McMurtrey, assignee Unarco, also known as U.S. Patent Publication No. US 2014/0159327 published Jun. 12, 2014.

Existing shopping carts have a frame that supports the basket, which frame is typically made predominately from metal tubing. However, metal tubing has greater weight and is more complicated and costly to manufacture than some other types of structural members. The overall weight and manufacturing cost of a shopping cart may be able to be reduced by advantageous structural modifications that reduce the amount of metal tubing used in the frame, but such modifications present challenges in maintaining suitable structural strength and durability. Existing shopping cart designs do not meet this need. The present disclosure is provided to address this need and other needs in existing shopping carts. A full discussion of the features and advantages of the present invention is deferred to the following detailed description, which proceeds with reference to the accompanying drawings.

SUMMARY

General aspects of the present disclosure relate to a shopping cart that includes a frame having a chassis portion and a handle portion extending upward from the chassis portion, a pair of front casters and a pair of rear casters mounted on the frame, and a basket connected to the frame and supported by the frame, the basket defining a chamber for holding articles, where the frame further includes a support structure connected to the chassis and the basket and supporting a portion of the basket. The support structure generally includes a plurality of brackets connected to the frame and the basket and a plurality of support members connected to the brackets and configured to support at least the basket of the shopping cart. The support structure may form part of a bracket assembly that further is configured to form a caster lift for nesting with another identical cart, and the bracket assembly may include one or more covers on one or more of the brackets to form the caster lift.

Aspects of the disclosure relate to a shopping cart as described above, in which the frame further includes a support structure (or a bracket assembly including such support structure) connected to the chassis and the basket and supporting a portion of the basket, where the support structure includes a first vertical support on a first lateral side of the shopping cart, a second vertical support on a second lateral side of the shopping cart opposite the first lateral side, and a cross-beam extending laterally between the first and second vertical supports beneath the basket. The first vertical support includes a first lower bracket connected the chassis on the first lateral side of the shopping cart, a first upper bracket connected to the basket on the first lateral side of the shopping cart, and a first leg extending from the first lower bracket to the first upper bracket, and the second vertical support includes a second lower bracket connected to the chassis on the second lateral side of the shopping cart, and a second upper bracket connected to the basket on the second lateral side of the shopping cart, and a second leg extending from the second lower bracket to the second upper bracket. The first upper bracket, the first lower bracket, the second upper bracket, and the second lower bracket are all identical to each other.

According to one aspect, the first upper bracket, the first lower bracket, the second upper bracket, and the second lower bracket each includes a metal plate having a first face and a second face having a length and a width, with a thickness defined between the first and second faces, where the length is greater than the width, and the width is greater than the thickness. Each bracket has a projection extending outward from the first face and a recess extending inward from the second face and corresponding to the projection. Additionally, the first upper bracket, the first lower bracket, the second upper bracket, and the second lower bracket may each further include a connecting structure connected to the first or second vertical support and a first arm and a second arm extending in opposite directions from the connecting structure. Further, the projection and the recess may be located on the first arm, and the second arm may have a second projection extending outward from the first face and a second recess extending inward from the second face and corresponding to the second projection.

According to another aspect, the first upper bracket, the first lower bracket, the second upper bracket, and the second lower bracket each includes a metal plate having a first face and a second face having a length and a width, with a thickness defined between the first and second faces, where the length is greater than the width, and the width is greater than the thickness. Each bracket has a projection extending outward from the first face and a recess extending inward from the second face and corresponding to the projection. Additionally, the cart may have a first cover connected to the first lower bracket and covering at least a portion of the first lower bracket and a second cover connected to the second lower bracket and covering at least a portion of the second lower bracket, each of the first and second covers having a first wall and a second wall and a cavity defined between the first and second walls. In this configuration, the first lower bracket is received within the cavity of the first cover such that the first wall confronts the first face and the second wall confronts the second face, and the second lower bracket is received within the cavity of the second cover such that the first wall confronts the first face and the second wall confronts the second face, the first and second covers further each having a ramped surface configured to form a caster lift for nesting with a second, identical shopping cart. Further, the first and second covers may each have a slot in the first wall, such that the first cover is press-fit on the first lower bracket and the projection of the first lower bracket is received in the slot of the first cover to retain the first cover in connection with the first lower bracket, and such that the second cover is press-fit on the second lower bracket and the projection of the second lower bracket is received in the slot of the second cover to retain the second cover in connection with the second lower bracket.

According to a further aspect, the first let, the second leg, and the cross-beam are formed of metallic wire. Additionally, the cross-beam may be welded to the first leg and the second leg, such that the cross-beam extends between the first leg and the second leg.

According to yet another aspect, the cart includes a first cover connected to the first lower bracket and covering at least a portion of the first lower bracket and a second cover connected to the second lower bracket and covering at least a portion of the second lower bracket. The first and second covers each have a ramped surface facing toward a front of the shopping cart, such that the first and second covers are configured to engage and lift a rear end of a chassis of a second, identical shopping cart when the shopping cart is nested inside the second, identical shopping cart.

Additional aspects of the disclosure relate to a shopping cart as described above, in which the frame further includes a support structure (or a bracket assembly including such support structure) connected to the chassis and the basket and supporting a portion of the basket, where the support structure includes a first vertical support on a first lateral side of the shopping cart, a second vertical support on a second lateral side of the shopping cart opposite the first lateral side, and a cross-beam extending laterally between the first and second vertical supports beneath the basket. The first vertical support includes a first lower bracket connected the chassis on the first lateral side of the shopping cart and a first leg extending upward from the first lower bracket and operably connected to the basket, and the second vertical support comprises a second lower bracket connected to the chassis on the second lateral side of the shopping cart and a second leg extending upward from the second lower bracket and operably connected to the basket. A first cover is connected to the first lower bracket and covers at least a portion of the first lower bracket, and a second cover is connected to the second lower bracket and covers at least a portion of the second lower bracket. The first and second covers each have a ramped surface facing toward a front of the shopping cart, such that the first and second covers are configured to engage and lift a rear end of a chassis of a second, identical shopping cart when the shopping cart is nested inside the second, identical shopping cart.

According to one aspect, the first lower bracket and the second lower bracket each includes a metal plate having a first face and a second face having a length and a width, with a thickness defined between the first and second faces, where the length is greater than the width, and the width is greater than the thickness. Each bracket has a projection extending outward from the first face and a recess extending inward from the second face and corresponding to the projection. Additionally, the first upper bracket, the first lower bracket, the second upper bracket, and the second lower bracket may each further include a connecting structure connected to the first or second vertical support and a first arm and a second arm extending in opposite directions from the connecting structure. In this configuration, the projection and the recess are located on the first arm, and the second arm has a second projection extending outward from the first face and a second recess extending inward from the second face and corresponding to the second projection.

According to another aspect, the first lower bracket and the second lower bracket each includes a metal plate having a first face and a second face having a length and a width, with a thickness defined between the first and second faces, where the length is greater than the width, and the width is greater than the thickness. Each bracket has a projection extending outward from the first face and a recess extending inward from the second face and corresponding to the projection. Additionally, each of the first and second covers may have a first wall and a second wall and a cavity defined between the first and second walls. In this configuration, the first lower bracket is received within the cavity of the first cover such that the first wall confronts the first face and the second wall confronts the second face, and the second lower bracket is received within the cavity of the second cover such that the first wall confronts the first face and the second wall confronts the second face. Further, the first and second covers may each have a slot in the first wall, such that the first cover is press-fit on the first lower bracket and the projection of the first lower bracket is received in the slot of the first cover to retain the first cover in connection with the first lower bracket, and such that the second cover is press-fit on the second lower bracket and the projection of the second lower bracket is received in the slot of the second cover to retain the second cover in connection with the second lower bracket.

According to a further aspect, the first leg, the second leg, and the cross-beam are formed of metallic wire, and the cross-beam is welded to the first leg and the second leg and extends between the first leg and the second leg.

According to yet another aspect, the first lower bracket and the second lower bracket are identical to each other. Additionally, the first and second covers may be identical to each other as well.

Further aspects of the disclosure relate to a bracket assembly configured for use with a shopping cart as described above. The bracket assembly includes a bracket configured for attachment to the shopping cart to connect the bracket assembly to the shopping cart, and a cover connected to the bracket and covering at least a portion of the bracket. The bracket includes a metal plate having a first face and a second face having a length and a width, with a thickness defined between the first and second faces, where the length is greater than the width, and the width is greater than the thickness. The bracket has a projection extending outward from the first face and a recess extending inward from the second face and corresponding to the projection.

The cover has a first wall and a second wall and a cavity defined between the first and second walls, and the bracket is received within the cavity such that the first wall confronts the first face and the second wall confronts the second face. The cover further has a slot in the first wall, such that the cover is press-fit on the bracket and the projection is received in the slot to retain the cover in connection with the bracket.

According to one aspect, the bracket assembly also includes a second bracket configured for attachment to the shopping cart to connect the bracket assembly to the shopping cart, and a first leg formed of a metallic wire and having first and second opposed ends, where the bracket is connected to the first end, and the second bracket is connected to the second end. The second bracket includes a second metal plate having a third face and a fourth face having a second length and a second width, with a second thickness defined between the third and fourth faces, where the second length is greater than the second width, and the second width is greater than the second thickness. The second bracket also has a second projection extending outward from the third face and a second recess extending inward from the fourth face and corresponding to the second projection.

According to another aspect, the bracket assembly further includes a second bracket as described above configured for attachment to the shopping cart to connect the bracket assembly to the shopping cart, and a support structure comprising one or more metallic wires and configured for supporting a basket of the shopping cart, wherein the bracket is connected to the support structure at a first location, and the second bracket is connected to the support structure at a second location spaced from the first location. Additionally, the bracket assembly may further include a second cover connected to the second bracket and covering at least a portion of the second bracket. In this configuration, the second cover has a third wall and a fourth wall and a second cavity defined between the third and fourth walls, and the second bracket is received within the second cavity such that the third wall confronts the third face and the fourth wall confronts the fourth face. The second cover in this configuration further has a second slot in the third wall, and the second cover is press-fit on the second bracket and the second projection is received in the second slot to retain the second cover in connection with the second bracket. Further, the cover may include a ramped surface the second cover may include a second ramped surface configured to combine with the ramped surface of the bracket to form a caster lift when the bracket assembly is connected to the shopping cart. Still further, the cover may have a third slot in the second wall symmetrically positioned relative to the slot in the first wall, and the second cover may have a fourth slot in the fourth wall symmetrically positioned relative to the second slot in the third wall, and the cover and the second cover may be identical to each other.

According to a further aspect, the bracket further includes a connecting structure configured for connection to a vertical support and a first arm and a second arm extending in opposite directions from the connecting structure. Additionally, the projection and the recess may be located on the first arm, and the second arm may have a second projection extending outward from the first face and a second recess extending inward from the second face and corresponding to the second projection. Further, in a configuration where the projection and the recess are located on the first arm, the cover may be connected to the first arm such that no portion of the second arm is covered by the cover.

According to yet another aspect, the cover further includes a ramped surface configured to form a caster lift when the bracket assembly is connected to the shopping cart.

According to a still further aspect, the cover further has a second slot in the second wall symmetrically positioned relative to the slot in the first wall.

Other aspects of the disclosure relate to a method for manufacturing a support structure, a bracket assembly including such a support structure, and a shopping cart including the bracket assembly and/or the support structure as described above. The support structure is assembled separately from the shopping cart and then connected to the shopping cart by welding or another integral joining technique, such that the support structure is joined to desired locations on the shopping cart to connect the support structure to the shopping cart. The support structure can be connected to the shopping cart by joining the brackets to various locations on the shopping cart and also optionally joining one or more support members (e.g., one or more legs or cross-beams) to the cart as well. Covers as described above may be connected to one or more of the brackets subsequent to connecting the support structure to the shopping cart, and the covers may be press-fit on the brackets without the use of tools or bonding materials.

Still further aspects of the disclosure relate to a kit for assembling a bracket assembly as described herein, including at least a bracket and a cover configured to be connected to the bracket by a press-fit connection.

Other features and advantages of the disclosure will be apparent from the following description taken in conjunction with the attached drawings.

BRIEF DESCRIPTION OF THE DRAWINGS

To allow for a more full understanding of the present disclosure, it will now be described by way of example, with reference to the accompanying drawings in which.

DETAILED DESCRIPTION OF EMBODIMENTS

In the following description of various example structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention. Also, while the terms "top," "bottom," "front," "back," "side," "rear," "proximal," "distal," and the like may be used in this specification to describe various example features and elements of the invention, these terms are used herein as a matter of convenience, e.g., based on the example orientations shown in the figures or the orientation during typical use. Nothing in this specification should be construed as requiring a specific three dimensional orientation of structures in order to fall within the scope of this invention, unless explicitly specified by the claims. "Integral joining technique," as used herein, means a technique for joining two pieces so that the two pieces effectively become a single, integral piece, including, but not limited to, irreversible joining techniques such as welding, brazing, soldering, or the like, where separation of the joined pieces cannot be accomplished without structural damage thereto.

Figure 1:
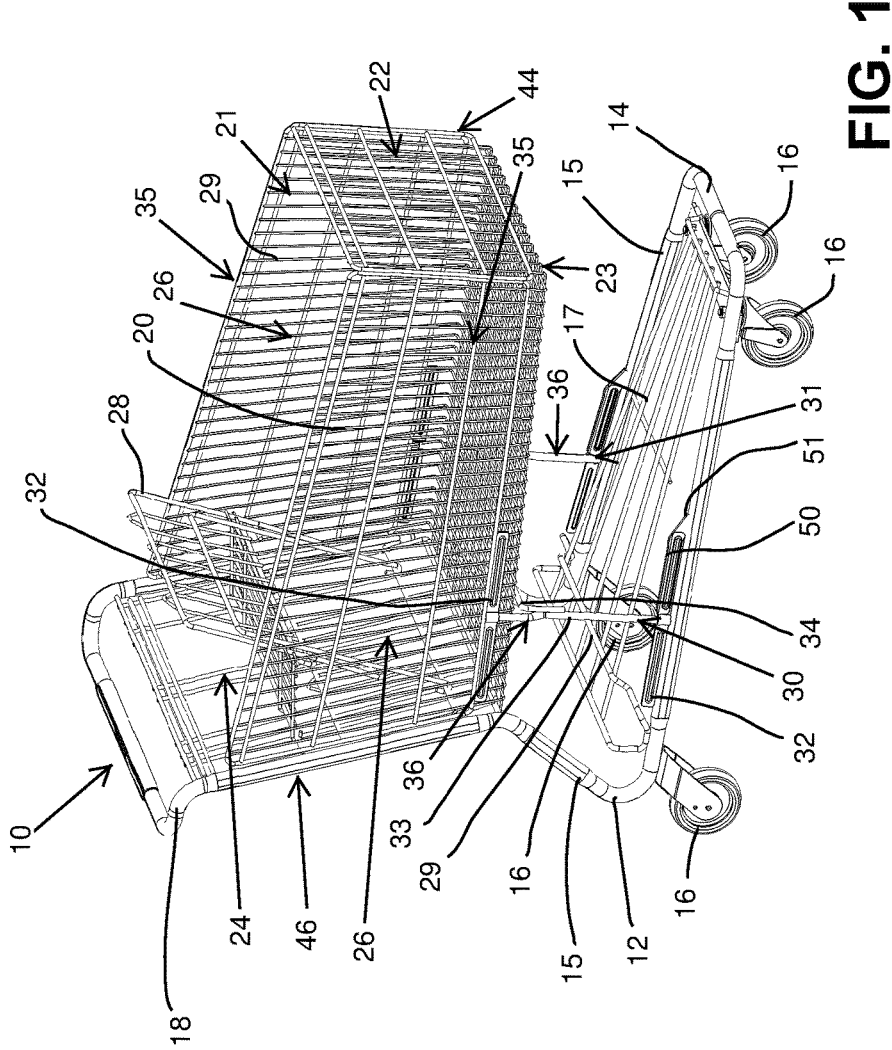
FIG. 1 is a top-front isometric view of one embodiment of a shopping cart according to aspects of the present disclosure.
Figure 2:
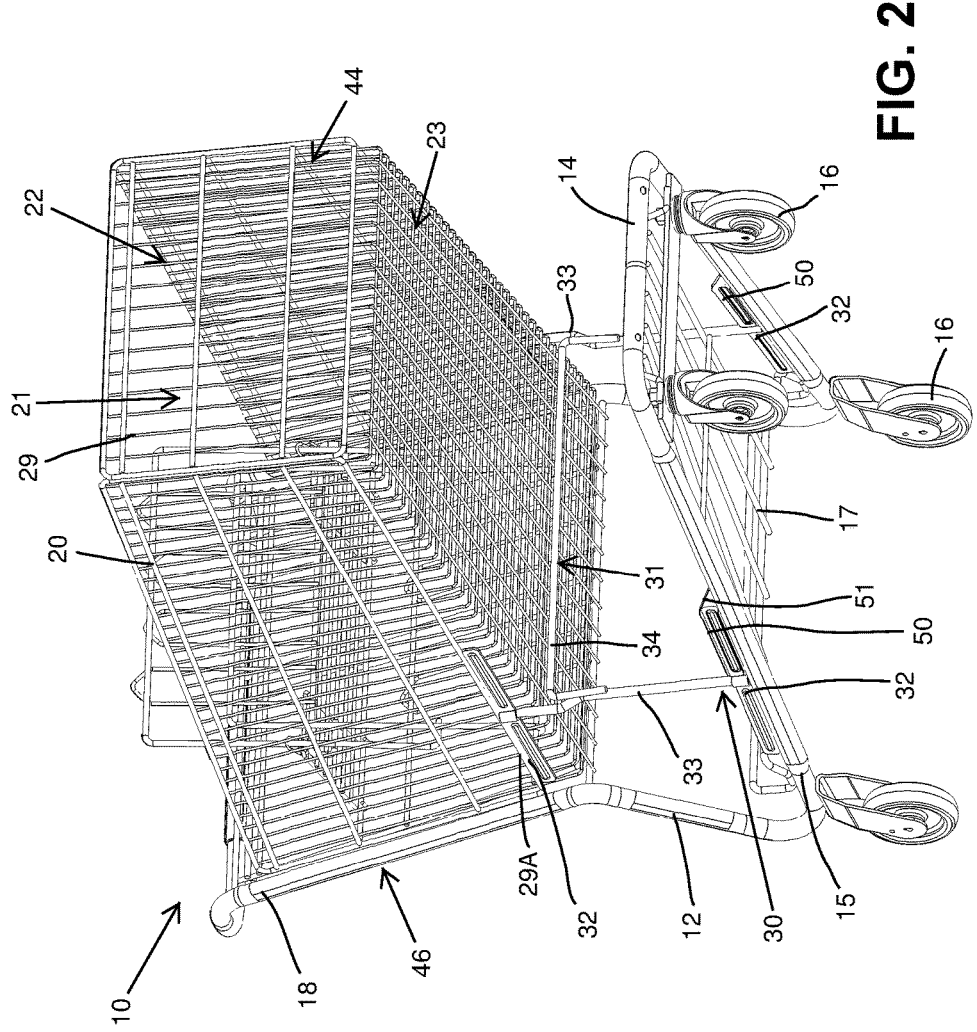
FIG. 2 is a bottom-front isometric view of the shopping cart of FIG. 1.
Figure 3:
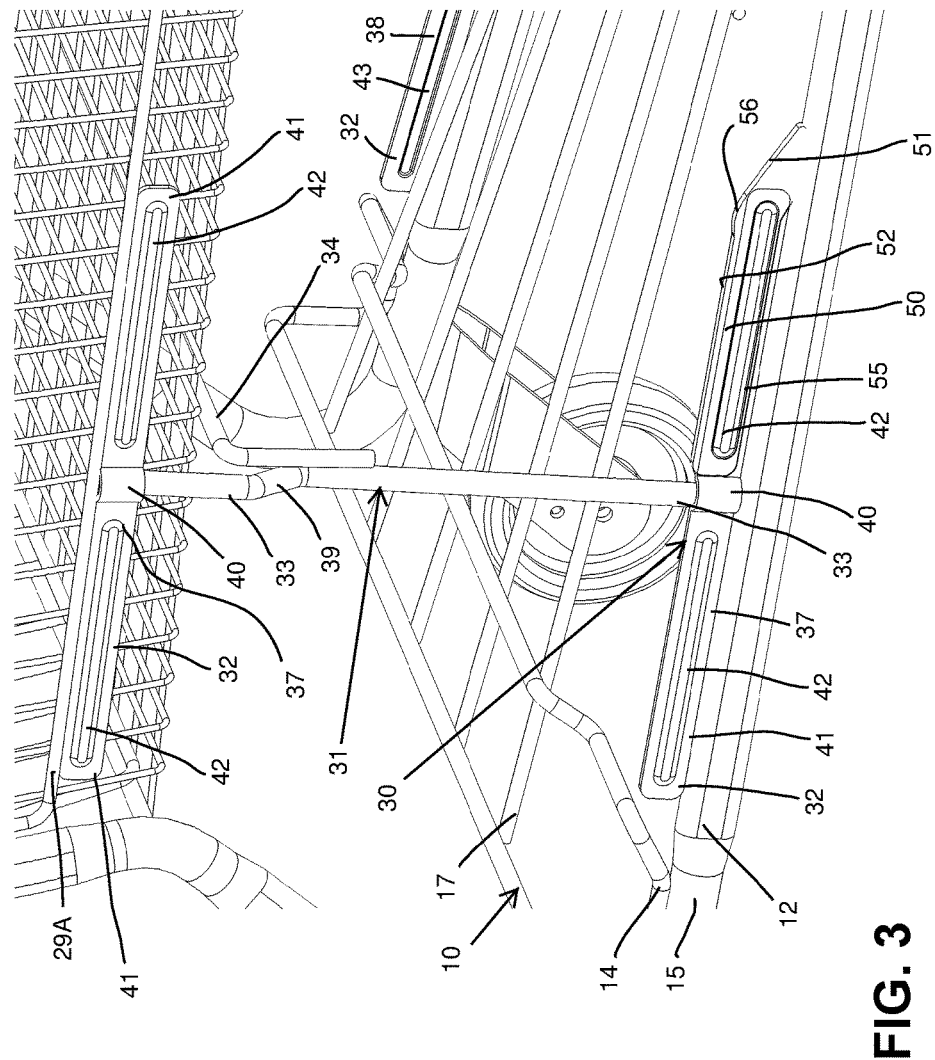
FIG. 3 is a magnified isometric view showing a portion of the shopping cart of FIG. 1.

Referring first to FIGS. 1-3, there is shown an example embodiment of an American-market, full-size, adult, wire-made shopping cart 10, which incorporates a support structure 31 and a bracket assembly 30 including the support structure 31 according to aspects of the present disclosure. It is understood that the shopping cart 10 in FIGS. 1-3 is shown by way of example, and the support structure 31 and bracket assembly 30 may be usable with many other differently configured shopping carts.

The cart 10 includes a frame 12 that includes a plurality of frame members 15 formed from steel tubing, and the frame 12 includes a chassis portion 14, to which casters 16 are mounted, and a handle portion 18. The rear two casters 16 track forward and back, and the front two casters 16 can also swivel. The frame 12 supports a basket 20 that defines a chamber 21 for holding articles. The chassis portion 14 may also include and support a lower shelf 17 that can also support articles. The basket 20 includes a front wall 22, a rear wall 24, and side walls 26 extending between the front and rear walls 22, 24, as well as a bottom or floor 23. The rear wall 24 is configured as a swinging real wall or gate, and may further be provided with a collapsible child seat 28. The basket 20 is connected to the chassis portion 14 and the handle portion 18 of the frame 12, by welding or other connection. The basket 20 and the lower shelf 17 are formed by metal wires 29 in the cart 10 illustrated in FIGS. 1-3.

The basket 20 may be formed by a mesh of crossing wires 29 that may be generally horizontal (extending between the sides 26 of the basket 20), generally vertical (extending from the top of the basket 20 toward the surface on which the cart 10 rests), or generally longitudinal (extending between the front 22 and rear 24 of the basket 20). In the configuration shown in FIGS. 1-3, the basket 20 is formed by a first set of wires 29 extending fully from one upper side rail adjacent the handle portion 18, around the sides 26 and front 22 of the basket 20, and to the opposite upper side rail adjacent the handle portion 18. A second set of wires 29 extend from a top wire 29 of the first set, down a side 26 of the basket 20, across the basket floor 23, and up the other side 26. A third set of wires 29 also extend from a top wire 29 of the first set, down the front 22 of the basket 20, and rearward across the floor 23 to the last wire 29 of the second set.

Figure 15:
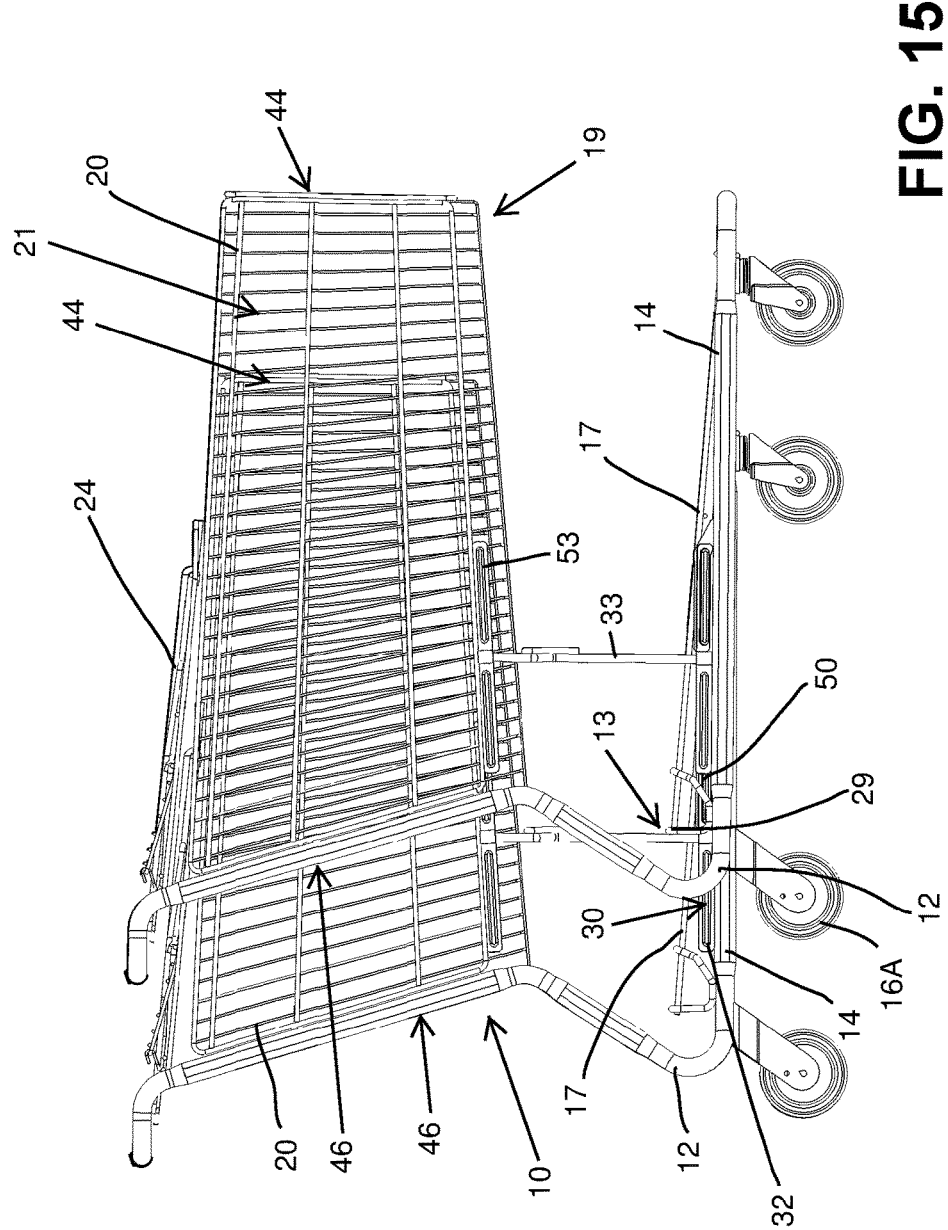
FIG. 15 is a side view of the shopping cart of FIG. 1 nested with a second, identical shopping cart.

The cart 10 is configured to be nested with a second cart 19, typically identical to the cart 10, as shown in FIG. 15. In this nesting configuration, the rear wall 24 of the second cart 19 swings upward as the basket 20 of the cart 10 is pushed inside the basket 20 of the second cart 19. The carts 10, 19 have a nesting stop 13 that serves as a point of contact between the two carts 10, 19, limiting the nesting distance, i.e., the distance between identical points on the two carts 10, 19, when the carts 10, 19 are fully nested. In the embodiment of FIGS. 1-3, the nesting stop 13 is created by engagement of part of the chassis portion 14 of the second (front) cart 19 with a portion of a bracket assembly 30, as described in greater detail herein. It is understood that the nesting stop 13 may be created by different structures in different locations in other carts.

According to aspects of this disclosure, the frame 12 of the cart 10 is provided with a bracket assembly 30 that forms a support structure 31 to at least partially support the basket 20. The bracket assembly 30 includes a plurality of brackets 32 connected to different locations on the cart 10 to connect the bracket assembly 30 to the cart 10, with a plurality of support members 33, 34 connected between the brackets 32 to support the basket 20. The bracket assembly 30 in the embodiment of FIGS. 1-3 is illustrated separately from the cart in FIGS. 4-5, and components of the bracket assembly 30 are illustrated in FIGS. 6-14. The bracket assembly 30 in FIGS. 1-3 includes four brackets 32 that are connected at four different locations on the cart 10. In this embodiment, two brackets 32 (which may be referred to as "lower brackets") are connected to the frame members 15 of the chassis portion 14 on the left and right lateral sides 35 of the cart 10. Also in this embodiment, two additional brackets 32 (which may be referred to as "upper brackets") are connected to the outer sides of the side walls 26 of the basket 20 on the left and right lateral sides 35 of the cart 10. In one embodiment, the brackets 32 may all be connected to the adjacent portions of the cart 10 by welding or another integral joining technique, although additional or alternate connection techniques may be used in other embodiments, such as adhesives or other bonding materials, or mechanical joining techniques (e.g., fasteners, interlocking components, and the like). In the embodiment of FIGS. 1-3, the lower brackets 32 are welded directly to the frame members 15 that extend along the chassis portion 14 on the left and right lateral sides 35 of the cart 10, and the upper brackets 32 are welded to the wires 29 of the basket 20, and more specifically, along the length of the longitudinally (i.e., front-to-rear) extending wires 29 of the basket 20 identified by reference numeral 29A.

The support members 33, 34 in the embodiment of FIGS. 1-3 include two vertical legs 33 extending between the upper and lower brackets 32 on each lateral side 35 of the cart 10, along with a horizontal support member or cross-beam 34 connected to the two legs 33 and extending between the two legs 33. The support structure 31 therefore includes two vertical supports 36, each connected to one lateral side 35 of the cart 10, with a cross-beam 34 extending between the vertical supports 36, where each of the vertical supports 36 includes upper and lower brackets 32 with a leg 33 extending between the brackets 32. The brackets 32, the legs 33, and the cross-beam 34 may all be connected together by welding or other integral joining technique in one embodiment, or any of the other additional or alternate connection techniques described herein. It is understood that the support members 33, 34, may be connected to the cart 10 as well, e.g., the cross-beam 34 may be welded to one or more wires 29 of the basket 20 as it extends along the bottom of the cart 20.

The brackets 32 in the embodiment of FIGS. 1-3 are all identical to each other and are usable in multiple locations and orientations, which provides the advantage of reducing the number of necessary parts. In other embodiments, the brackets 32 may be different from each other, and may be specifically designed for their desired location and orientation, and it is understood that such brackets 32 may still include any of the components and features described herein. The brackets 32 used in the cart 10 in FIGS. 1-3 are illustrated in greater detail in FIGS. 4-11. In this embodiment, the bracket 32 is formed of a single piece of metal plate that is cut to shape and stamped to form desired features and surface contours, with the plate having opposed first and second faces 37, 38 that define a width and a length, with a thickness defined between the faces 37, 38. The term "plate" as used herein implies only that the thickness is smaller than the length and the width of the piece, and the term "plate" does not connote any specific thickness unless otherwise noted; therefore, the term "plate" broadly encompasses a wide variety of metal plates, sheets, and other such structures. In one embodiment, the plate of the bracket 32 has a thickness of between 0.125 inch and 0.1875 inch. The bracket 32 in the embodiment of FIGS. 1-11 is elongated, such that the width is smaller than the length. Additionally, the bracket in FIGS. 1-11 has a connecting structure 40 for connection to the leg 33, with two arms 41 extending symmetrically from opposite sides of the connecting structure 40. The connecting structure 40 is configured as a notch 40 in FIGS. 1-11, and the end of the leg 33 is received and welded within the notch 40 to connect the leg 33 to the bracket 32. The notch 40 is open on the top and bottom sides in this embodiment, to allow connection of the leg 33 from above or below. In other embodiments, a different connecting structure 40 may be used, using any of the connection techniques mentioned herein, and the leg 33 may be configured to engage a different connecting structure. Additionally, the connecting structure 40 may be located at a different position in other embodiments, such as at an end of the bracket 32.

In one embodiment, the bracket 32 has at least one projection 42 formed in the first face 37 and a corresponding recess 43 formed in the second face 38. The bracket 32 in the embodiment of FIGS. 1-11 has two projections 42, with one projection 42 formed on each arm 41 of the bracket 32. These projections 42 are elongated along the same axis as the plate of the bracket 32 itself and run the majority of the length of each arm 41. The recesses 43 are similarly dimensioned. In another embodiment, each arm 41 may have multiple projections 42, e.g., by replacing each projection 42 with a series of linearly-aligned smaller projections 42. The projections 42 in the embodiment of FIGS. 1-11 are configured to serve a mounting function as described herein, although it is understood that the projections 42 also increase rigidity of the bracket 32, thereby allowing a thinner plate to be used and reducing material usage and cost.

Figure 4:
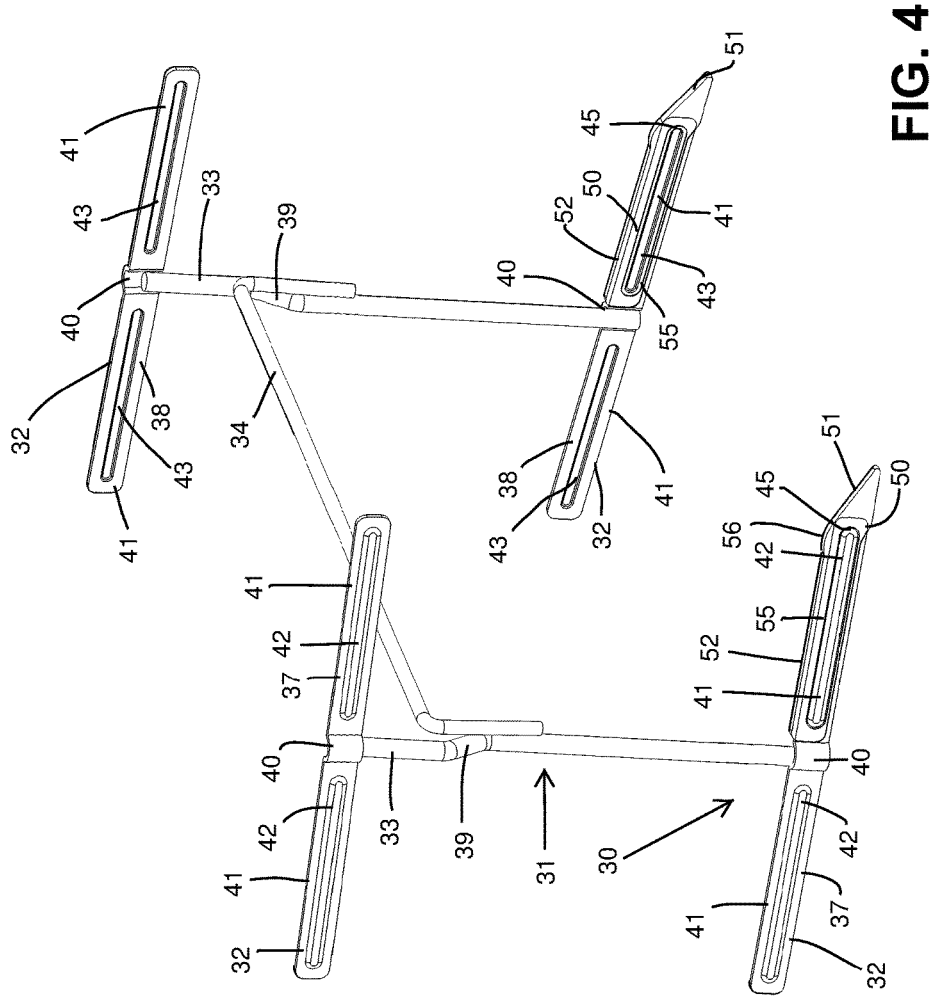
FIG. 4 is a top-front isometric view of one embodiment of a support structure of the shopping cart of FIG. 1, according to aspects of the present disclosure.
Figure 5:
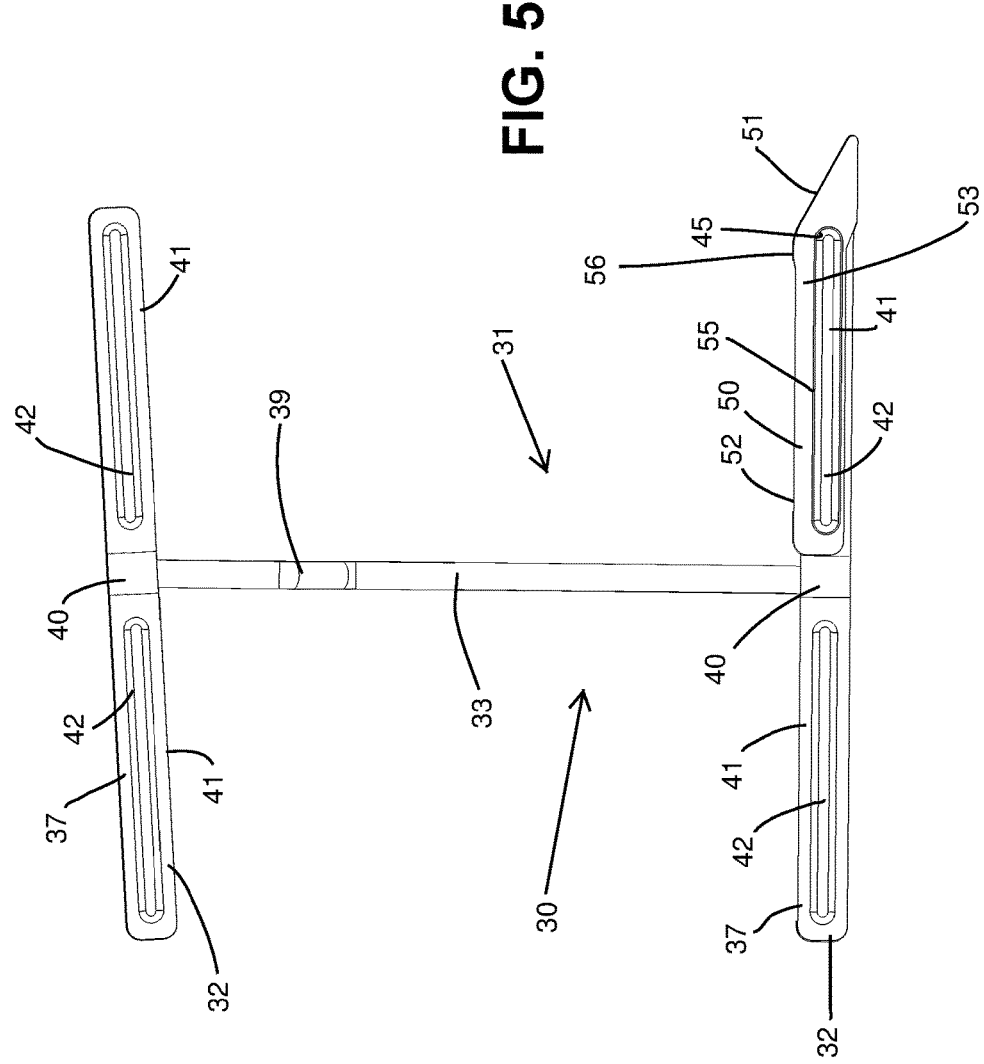
FIG. 5 is a side view of the support structure of FIG. 4.
Figure 6:
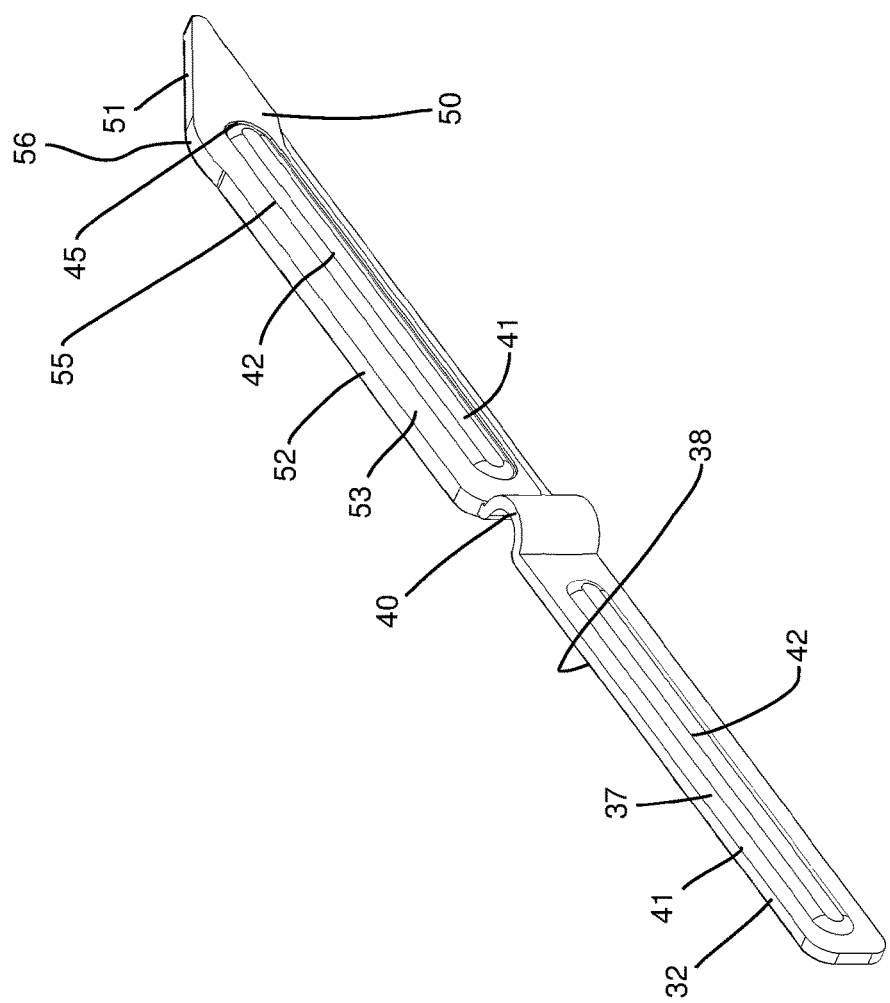
FIG. 6 is a top-rear isometric view of one embodiment of a bracket and a cover of the support structure of FIG. 4, according to aspects of the present disclosure.
Figure 7:
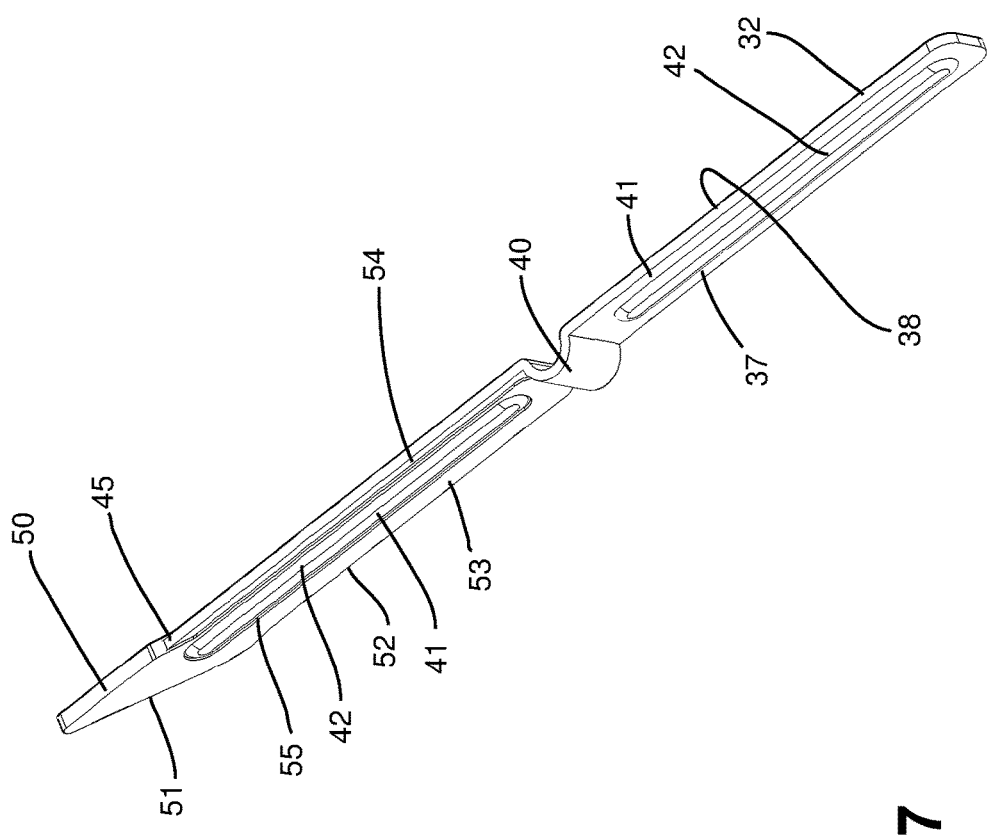
FIG. 7 is a bottom-rear isometric view of the bracket and cover of FIG. 6.
Figure 8:
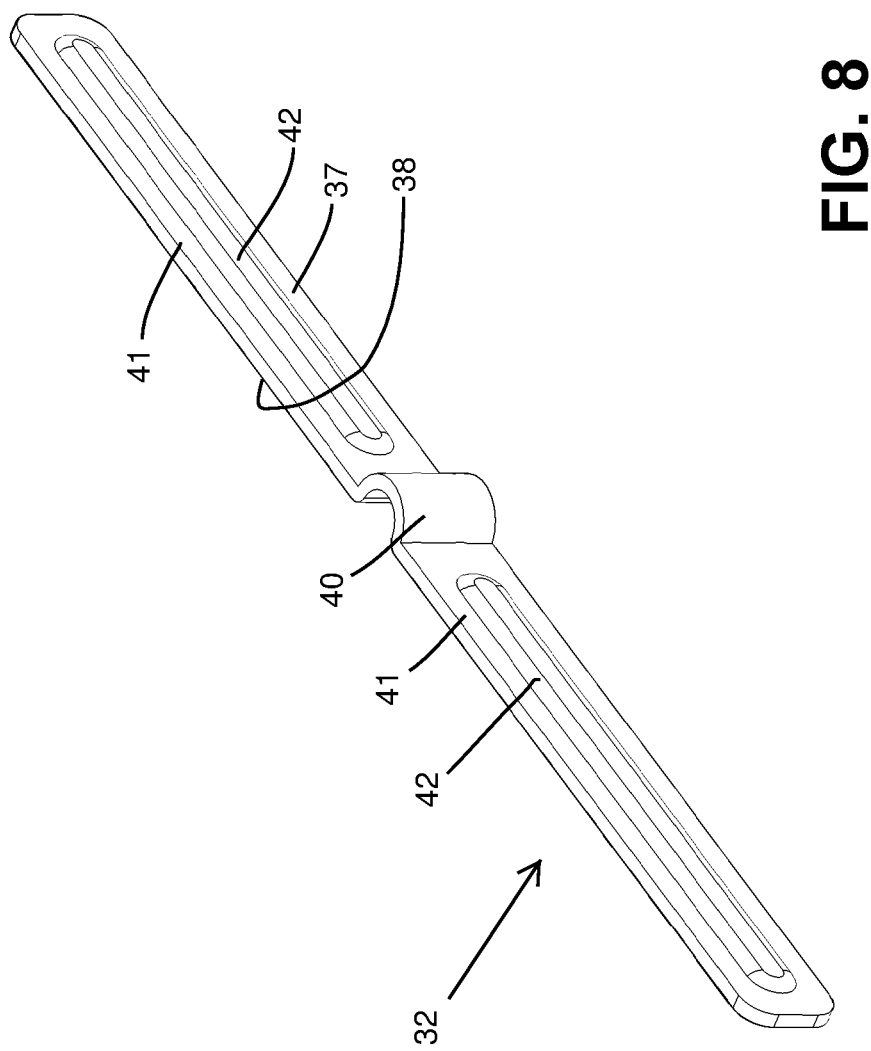
FIG. 8 is a top-rear isometric view of the bracket of FIG. 6.
Figure 9:
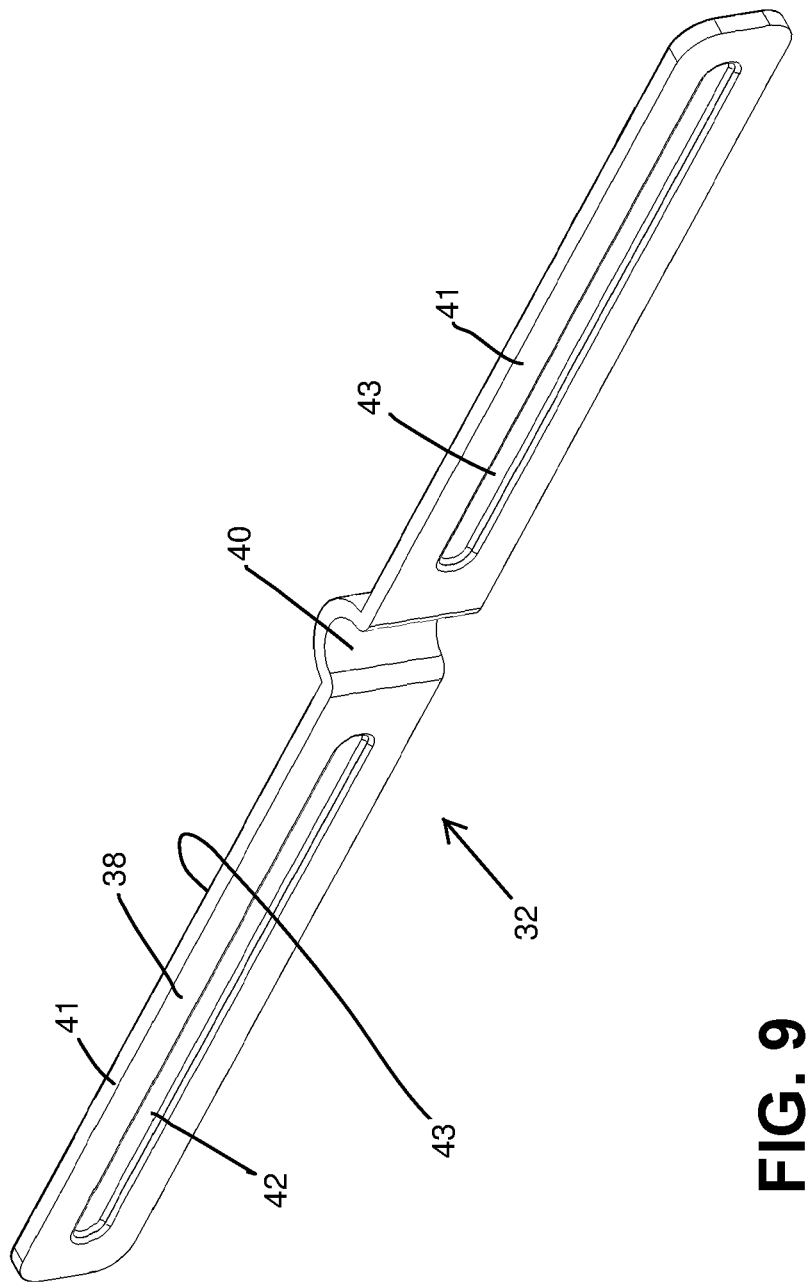
FIG. 9 is a bottom-rear isometric view of the bracket of FIG. 6.
Figure 10:
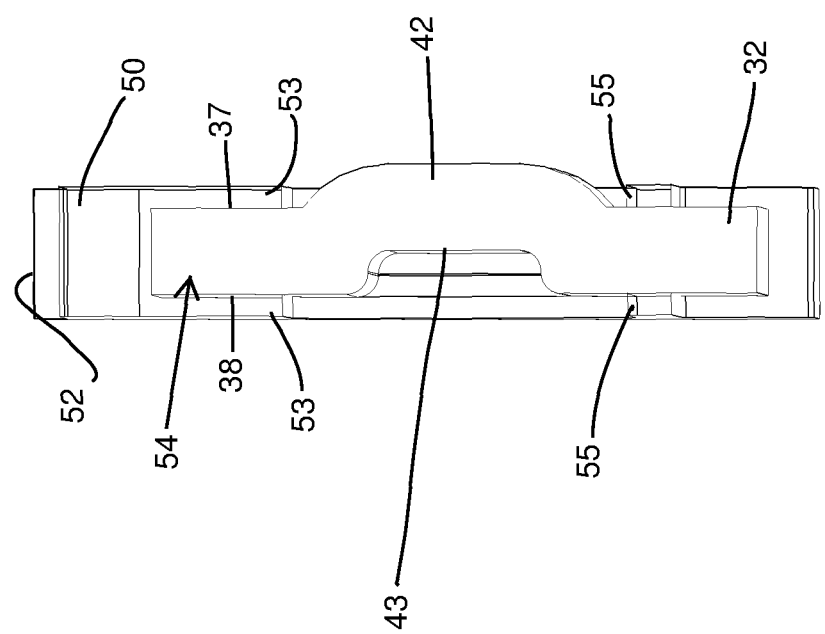
FIG. 10 is a cross-section view of the bracket and cover of FIG. 6, taken along lines 10-10 in FIG. 6.
Figure 11:
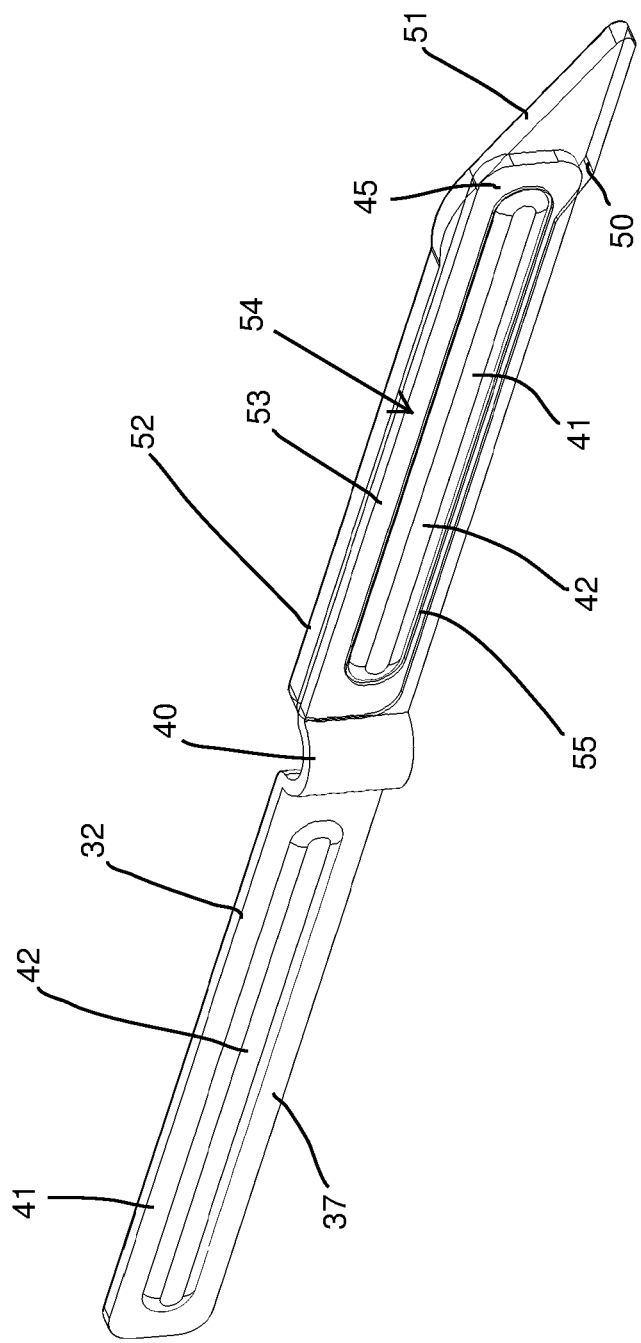
FIG. 11 is a top-front isometric view of the bracket and cover of FIG. 6, with the cover shown transparently.
Figure 12:
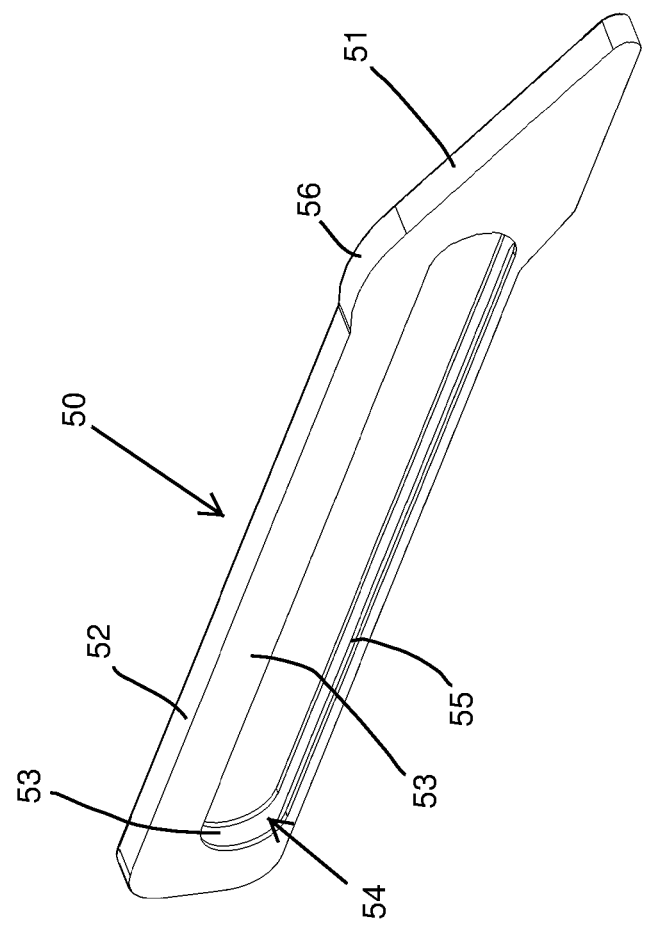
FIG. 12 is a top-front perspective view of the cover of FIG. 6.
Figure 13:
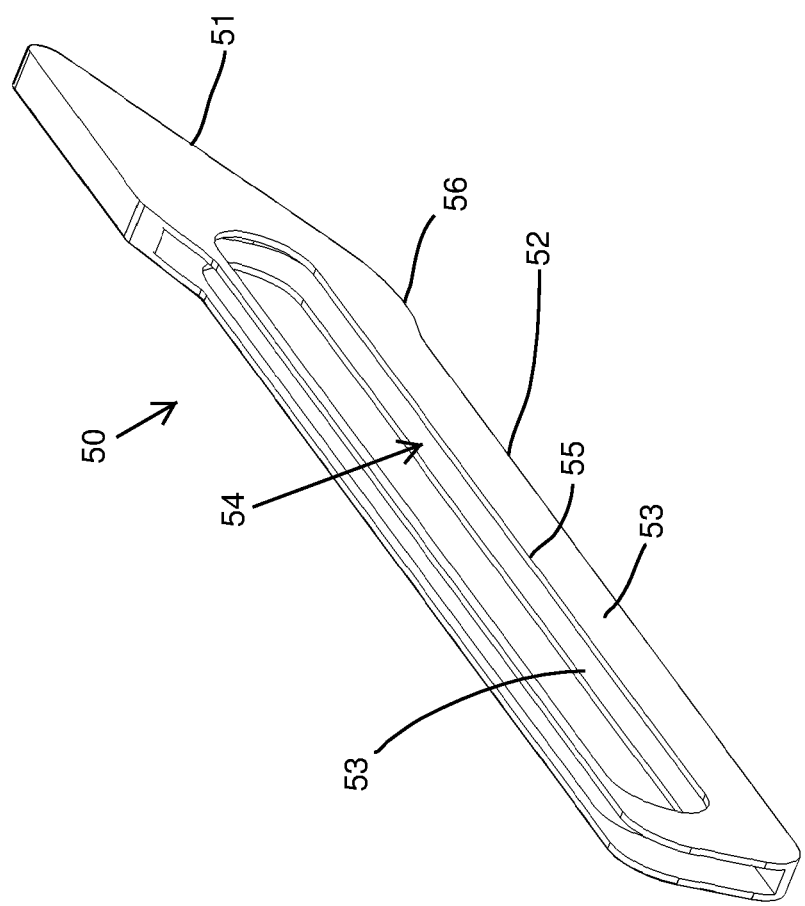
FIG. 13 is a bottom-rear perspective view of the cover of FIG. 6.
Figure 14:
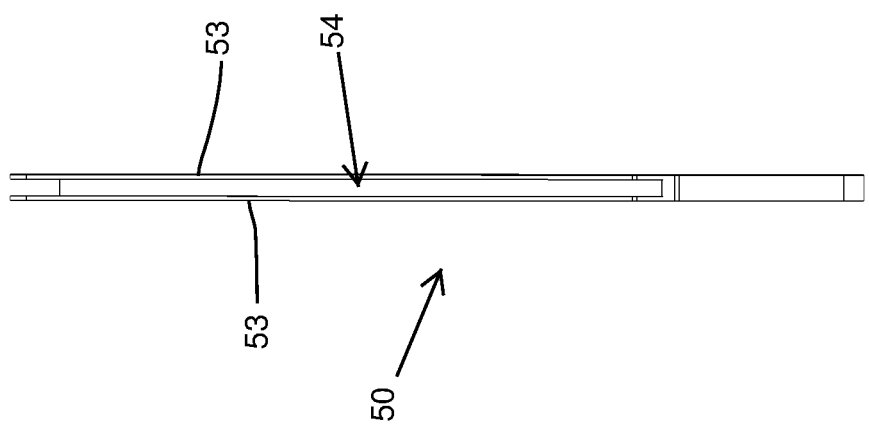
FIG. 14 is a bottom view of the cover of FIG. 6.

The support members 33, 34 in the embodiment of FIGS. 1-3 are illustrated in greater detail in FIGS. 4-5. In this embodiment, the support members 33, 34 are all configured as metal wires having a thickness/diameter of ⅜ inch to ½ inch, or 0.47" in one embodiment. The wires forming the support members 33, 34 may be formed of low carbon steel (e.g., 1008 or 1006) to provide suitable strength. The legs 33 in the embodiment of FIGS. 1-5 are identical to each other and oriented at opposite orientations, such that both legs 33 are generally vertical over the majority of their lengths, with a jog portion 39 that extends laterally outwardly, i.e., away from the longitudinal centerline of the cart 10 when assembled. The cross-beam 34 is connected to the legs 33 by welding at opposite ends, but may be connected using any other connection technique described herein. The cross-beam 34 in the embodiment of FIGS. 1-5 is formed of a laterally or horizontally extending wire that has vertical portions at the ends to form greater contact area for welding to the legs 33. In this configuration, vertical, parallel portions of the cross-beam 34 and the legs 33 are welded together. In another embodiment, the legs 33 and the cross-beam 34 may be formed as a single piece, rather than separate pieces welded together.

In addition to the support structure 31, in one embodiment, the bracket assembly 30 includes one or more covers 50 that are engaged with one or more of the brackets 32 to form a caster lift for nesting. The covers 50 in the embodiment of FIGS. 1-3 are illustrated in greater detail in FIGS. 4-7 and 10-14. The cart 10 in the embodiment of FIGS. 1-3 has covers 50 on both of the lower brackets 32. Each cover 50 is connected to a bracket 32 and covers at least a portion of the bracket 32, and in one embodiment, at least a leading end 45 of the bracket 32 is covered by the cover 50. The leading end 45 of the bracket 32 is defined as the end of the bracket 32 that is closest to the front 44 of the cart 10 when assembled. In the embodiment of FIGS. 1-3, the covers 50 are connected to the arm 41 that extends forward (toward the front 44 of the cart) from the connecting structure 40 and cover the leading end 45, as well as the entire top side of the arm 41 and the majority of the surfaces of the arm 41. The connection of the bracket 32 and the cover 50 is illustrated in FIGS. 4-7 and 10-11. As illustrated, the cover 50 has a ramped surface 51 positioned at the leading end 45 of the bracket 32, such that the ramped surface 51 faces the front 44 of the cart 10 when assembled. This permits the ramped surfaces 51 in combination to form a caster lift for nesting of the cart 10 with a second identical cart 10, as discussed herein.

As discussed above, FIG. 15 illustrates the nesting of the cart 10 with a second, identical cart 19, where both carts 10, 19 include a bracket assembly 30 with covers 50 as illustrated in FIGS. 1-7 and 10-11. When the cart 10 is pushed into the second cart 19 to nest the carts 10, 19 together, the chassis portion 14 of the first (rear) cart passes beneath the chassis portion 14 of the second (front) cart 19, and the chassis portion 14 of the second cart 19 contacts the ramped surfaces 51 of the bracket assembly 30 to lift the rear 46 of the second cart 19 so that the rear casters 16A of the second cart 19 no longer touch the ground. As shown in FIG. 15, the ramped surfaces 51 are engaged by one of the wires of the lower shelf 17 in this embodiment. The chassis portion 14 of the second cart 19 then rests partially upon the top surfaces 52 of the covers 50, such that the top surfaces 52 of the covers 50 form a chassis rest during nesting. The top surfaces 52 of the covers 50 in the embodiment of FIGS. 1-7 and 10-14 also have a ridge or hump 56 at the top of the ramped surface 51, which the chassis portion 14 of the second cart 19 slides over during nesting. In one embodiment, the nesting stop 13 is created by engagement of part of the chassis portion 14 of the second cart 19 with a portion of a bracket assembly 30 of the cart 10. In the embodiment shown in FIG. 15, the nesting stop 13 is created by engagement of another one of the wires 29 forming the lower shelf 17 of the second cart 19 with the legs 33 of the cart 10.

The cover 50 in the embodiment of FIGS. 1-7 and 10-14 is configured for connection to the bracket 32 by press-fit and mechanical engagement, and the structure of the cover 50 in this embodiment is configured for engaging the structure of the bracket 32. In this embodiment, the cover 50 has two parallel walls 53 that depend from the top surface 52 and are spaced from each other, such that a cavity 54 is defined between the walls 53. The cover 50 in this configuration is connected to the bracket 32 by inserting the bracket 32 to be received within the cavity 54, such that the two walls 52 confront the first and second faces 37, 38 of the bracket 32. The cover 50 also has structures for interlocking with structures of the bracket 32 in one embodiment. As shown in FIGS. 1-7 and 10-14, the cover has a slot 55 in at least one of the walls 53 to receive the projection 42 of the bracket 32 therein. The slot 55 is dimensioned to engage the projection 42 to retain the cover 50 securely connected to the bracket 32 when the cover 50 is press-fit on the bracket 32. In embodiments where the projection 42 is configured differently, or configured as multiple projections 42, the slot 55 may be configured to correspond to the structure of the projection(s) 42. For example, in embodiments where the bracket 32 includes multiple projections 42 on one arm 41, the cover 50 may be configured with multiple slots 55 and/or a slot 55 that receives multiple projections 42 therein. Additionally, the cover 50 in the embodiment of FIGS. 1-7 and 10-14 has identical slots 55 in each of the walls 53, so the cover 50 can be engaged with the bracket 32 in multiple orientations, i.e., with the projection 42 facing either of the walls 53 of the cover 50.

The cover 50 in one embodiment may be formed of a plastic or other polymer material, such as high density polyethylene (HDPE) or nylon. Various manufacturing techniques may be used to form the cover 50 from a polymer material, and in one embodiment, the cover 50 may be formed by injection molding. In other embodiments, the cover 50 may be formed of a metal or other material. In further embodiments, the cover 50 may be an integral part of the bracket 32, such as by being formed of a single piece and/or two pieces integrally joined together. For example, in one embodiment, the combination of the cover 50 and the bracket 32 shown in FIGS. 6-7 may be formed of a single, integral piece, such that the bracket 32 has the ramped surface 51 and the top surface 52 defined thereon to function as a caster lift and a chassis rest, respectively. In such a configuration, the upper brackets 32 used on the left side of the cart 10 may not be identical to the brackets 32 on the right side of the cart 10 and/or the upper brackets 32 may not be identical to the lower brackets 32.

In one embodiment, the entire support structure 31 of the bracket assembly 30 may be assembled prior to assembly of the cart 10, and the support structure 31 can be connected to the cart 10 by welding the brackets 32 to the basket 20 and frame 12 as described herein. The covers 50 can be connected to the lower brackets 32 by press fitting onto the brackets 32 after the welding connections are made in one embodiment, although it is understood that the covers 50 may be connected prior to connection of the support structure 31 to the cart 10 in another embodiment.

The various embodiments of bracket assemblies 30 and shopping carts 10 incorporating the bracket assemblies 30 described herein provide advantages over existing shopping carts 10 and frames 12 for such carts 10. For example, the use of wire support members 33, 34 rather than metal tubing for supporting the basket 20 of the cart 10 provides sufficient structural strength with significantly lower material usage, weight, and ease of assembly. As another example, the use of identical brackets 32 and covers 50 in multiple different locations of the bracket assembly 30 reduces the number of necessary parts for assembly and thereby also reduces cost of assembly. The use of stamped brackets 32 and covers 50 that can be connected by press-fit without tools or bonding techniques also reduces the cost of manufacturing and assembly. Still further benefits are recognizable by those skilled in the art.

While the invention has been described with respect to specific examples including presently preferred modes of carrying out the invention, those skilled in the art will appreciate that there are numerous variations and permutations of the above described systems and methods. In particular, any of the various components and features described herein can be used in combination with any other components and features, including alternate embodiments. Thus, the spirit and scope of the invention should be construed broadly as set forth in the appended claims.

What is claimed is:

1. A shopping cart comprising:
   a frame comprising a chassis portion and a handle portion extending upward from the chassis portion;
   a pair of front casters and a pair of rear casters mounted on the frame; and
   a basket connected to the frame and supported by the frame, the basket defining a chamber for holding articles,
   wherein the frame further comprises a support structure connected to the chassis portion and the basket and supporting a portion of the basket, the support structure comprising a first vertical support on a first lateral side of the shopping cart, a second vertical support on a second lateral side of the shopping cart opposite the first lateral side, and a cross-beam extending laterally between the first and second vertical supports beneath the basket, wherein the first vertical support comprises a first lower bracket connected the chassis portion on the first lateral side of the shopping cart, a first upper bracket connected to the basket on the first lateral side of the shopping cart, and a first leg extending from the first lower bracket to the first upper bracket, and wherein the second vertical support comprises a second lower bracket connected to the chassis portion on the second lateral side of the shopping cart, and a second upper bracket connected to the basket on the second lateral side of the shopping cart, and a second leg extending from the second lower bracket to the second upper bracket, and wherein the first upper bracket, the first lower bracket, the second upper bracket, and the second lower bracket are all identical to each other.

2. The shopping cart of claim 1, wherein the first upper bracket, the first lower bracket, the second upper bracket, and the second lower bracket each comprises a metal plate having a first face and a second face having a length and a width, with a thickness defined between the first and second faces, wherein the length is greater than the width, and the width is greater than the thickness, each of the first upper bracket, the first lower bracket, the second upper bracket, and the second lower bracket having a projection extending outward from the first face and a recess extending inward from the second face and corresponding to the projection.

3. The shopping cart of claim 2, wherein the first upper bracket, the first lower bracket, the second upper bracket, and the second lower bracket each further comprises a connecting structure connected to the first or second vertical support and a first arm and a second arm extending in opposite directions from the connecting structure, wherein the projection and the recess are located on the first arm, and wherein the second arm has a second projection extending outward from the first face and a second recess extending inward from the second face and corresponding to the second projection.

4. The shopping cart of claim 2, further comprising a first cover connected to the first lower bracket and covering at least a portion of the first lower bracket and a second cover connected to the second lower bracket and covering at least a portion of the second lower bracket, each of the first and second covers having a first wall and a second wall and a cavity defined between the first and second walls, wherein the first lower bracket is received within the cavity of the first cover such that the first wall confronts the first face and the second wall confronts the second face, and wherein the second lower bracket is received within the cavity of the second cover such that the first wall confronts the first face and the second wall confronts the second face, the first and second covers further each having a ramped surface configured to form a caster lift for nesting with a second, identical shopping cart.

5. The shopping cart of claim 4, wherein the first and second covers each further have a slot in the first wall, wherein the first cover is press-fit on the first lower bracket and the projection of the first lower bracket is received in the slot of the first cover to retain the first cover in connection with the first lower bracket, and wherein the second cover is press-fit on the second lower bracket and the projection of the second lower bracket is received in the slot of the second cover to retain the second cover in connection with the second lower bracket.

6. The shopping cart of claim 1, wherein the first leg, the second leg, and the cross-beam are formed of metallic wire.

7. The shopping cart of claim 6, wherein the cross-beam is welded to the first leg and the second leg and extends between the first leg and the second leg.

8. The shopping cart of claim 1, further comprising a first cover connected to the first lower bracket and covering at least a portion of the first lower bracket and a second cover connected to the second lower bracket and covering at least a portion of the second lower bracket, wherein the first and second covers each have a ramped surface facing toward a front of the shopping cart, such that the first and second covers are configured to engage and lift a rear end of a chassis of a second, identical shopping cart when the shopping cart is nested inside the second, identical shopping cart.

9. A shopping cart comprising:
a frame comprising a chassis portion and a handle portion extending upward from the chassis portion;
a pair of front casters and a pair of rear casters mounted on the frame;
a basket connected to the frame and supported by the frame, the basket defining a chamber for holding articles,
wherein the frame further comprises a support structure connected to the chassis portion and the basket and supporting a portion of the basket, the support structure comprising a first vertical support on a first lateral side of the shopping cart, a second vertical support on a second lateral side of the shopping cart opposite the first lateral side, and a cross-beam extending laterally between the first and second vertical supports beneath the basket, wherein the first vertical support comprises a first lower bracket connected the chassis portion on the first lateral side of the shopping cart and a first leg extending upward from the first lower bracket and operably connected to the basket, and wherein the second vertical support comprises a second lower bracket connected to the chassis portion on the second lateral side of the shopping cart and a second leg extending upward from the second lower bracket and operably connected to the basket, wherein the first lower bracket has a first projection extending outward therefrom, and the second lower bracket has a second projection extending outward therefrom;
a first cover connected to the first lower bracket and covering at least a portion of the first lower bracket; and
a second cover connected to the second lower bracket and covering at least a portion of the second lower bracket,
wherein the first and second covers each have a ramped surface facing toward a front of the shopping cart, such that the first and second covers are configured to engage and lift a rear end of a chassis of a second, identical shopping cart when the shopping cart is nested inside the second, identical shopping cart, and
wherein the first cover has a first slot, and the second cover has a second slot, and wherein the first projection of the first lower bracket is received in the first slot to retain the first cover in connection with the first lower bracket, and the second projection of the second lower bracket is received in the second slot to retain the second cover in connection with the second lower bracket.

10. The shopping cart of claim 9, wherein the first leg, the second leg, and the cross-beam are formed of metallic wire, wherein the cross-beam is welded to the first leg and the second leg and extends between the first leg and the second leg.

11. The shopping cart of claim 9, wherein the first lower bracket and the second lower bracket are identical to each other.

12. The shopping cart of claim 11, wherein the first and second covers are identical to each other.

13. The shopping cart of claim 9, wherein the first lower bracket and the second lower bracket each further comprises a connecting structure connected to the first or second vertical support and a first arm and a second arm extending in opposite directions from the connecting structure, wherein the first and second projections are located on the first arm of the first and second lower brackets, respectively, and wherein the second arm of each of the first and second lower brackets has an additional projection extending outward therefrom.

14. The shopping cart of claim 9, wherein the first projection is elongated and is positioned on a first flat, elongated surface of the first lower bracket, and the second projection is elongated and is positioned on a second flat, elongated surface of the second lower bracket, and wherein the first and second slots are also elongated.

15. The shopping cart of claim 9, wherein the first cover is press-fit on the first lower bracket, and the second cover is press-fit on the second lower bracket.

16. A shopping cart comprising:
a frame comprising a chassis portion and a handle portion extending upward from the chassis portion;
a pair of front casters and a pair of rear casters mounted on the frame;
a basket connected to the frame and supported by the frame, the basket defining a chamber for holding articles, wherein the frame further comprises a support structure connected to the chassis portion and the basket and supporting a portion of the basket, the support structure comprising a first vertical support on a first lateral side of the shopping cart, a second vertical support on a second lateral side of the shopping cart opposite the first lateral side, and a cross-beam extending laterally between the first and second vertical supports beneath the basket, wherein the first vertical support comprises a first lower bracket connected the chassis portion on the first lateral side of the shopping cart and a first leg extending upward from the first lower bracket and operably connected to the basket, and wherein the second vertical support comprises a second lower bracket connected to the chassis portion on the second lateral side of the shopping cart and a second leg extending upward from the second lower bracket and operably connected to the basket;

a first cover connected to the first lower bracket and covering at least a portion of the first lower bracket; and a second cover connected to the second lower bracket and covering at least a portion of the second lower bracket, wherein the first and second covers each have a ramped surface facing toward a front of the shopping cart, such that the first and second covers are configured to engage and lift a rear end of a chassis of a second, identical shopping cart when the shopping cart is nested inside the second, identical shopping cart, and wherein the first lower bracket and the second lower bracket each comprises a metal plate having a first face and a second face having a length and a width, with a thickness defined between the first and second faces, wherein the length is greater than the width, and the width is greater than the thickness, each of the first and second lower brackets having a projection extending outward from the first face and a recess extending inward from the second face and corresponding to the projection.

17. The shopping cart of claim 16, wherein the first lower bracket and the second lower bracket each further comprises a connecting structure connected to the first or second vertical support and a first arm and a second arm extending in opposite directions from the connecting structure, wherein the projection and the recess are located on the first arm, and wherein the second arm has a second projection extending outward from the first face and a second recess extending inward from the second face and corresponding to the second projection.

18. The shopping cart of claim 16, wherein each of the first and second covers has a first wall and a second wall and a cavity defined between the first and second walls, wherein the first lower bracket is received within the cavity of the first cover such that the first wall confronts the first face and the second wall confronts the second face, and wherein the second lower bracket is received within the cavity of the second cover such that the first wall confronts the first face and the second wall confronts the second face.

19. The shopping cart of claim 18, wherein the first and second covers each further have a slot in the first wall, wherein the first cover is press-fit on the first lower bracket and the projection of the first lower bracket is received in the slot of the first cover to retain the first cover in connection with the first lower bracket, and wherein the second cover is press-fit on the second lower bracket and the projection of the second lower bracket is received in the slot of the second cover to retain the second cover in connection with the second lower bracket.

20. A shopping cart comprising:

a frame comprising a chassis portion and a handle portion extending upward from the chassis portion;

a pair of front casters and a pair of rear casters mounted on the frame; and a basket connected to the frame and supported by the frame, the basket defining a chamber for holding articles, wherein the frame further comprises a support structure connected to the chassis portion and the basket and supporting a portion of the basket, the support structure comprising a first vertical support on a first lateral side of the shopping cart, a second vertical support on a second lateral side of the shopping cart opposite the first lateral side, and a cross-beam extending laterally between the first and second vertical supports beneath the basket, wherein the first vertical support comprises a first lower bracket connected the chassis portion on the first lateral side of the shopping cart, a first upper bracket connected to the basket on the first lateral side of the shopping cart, and a first leg extending from the first lower bracket to the first upper bracket, and wherein the second vertical support comprises a second lower bracket connected to the chassis portion on the second lateral side of the shopping cart, and a second upper bracket connected to the basket on the second lateral side of the shopping cart, and a second leg extending from the second lower bracket to the second upper bracket, wherein the first upper bracket, the first lower bracket, the second upper bracket, and the second lower bracket each further comprises a connecting structure connected to the first or second vertical support and a first arm extending from the connecting structure, and wherein the first arms of the first upper bracket, the first lower bracket, the second upper bracket, and the second lower bracket are all identical to each other.

21. The shopping cart of claim 20, wherein the first upper bracket, the first lower bracket, the second upper bracket, and the second lower bracket each further comprises a second arm extending from the connecting structure, such that the first arm and the second arm extend in opposite directions from the connecting structure, and wherein the second arms of the first upper bracket, the first lower bracket, the second upper bracket, and the second lower bracket are all identical to each other.

22. The shopping cart of claim 20, wherein the first leg, the second leg, and the cross-beam are formed of metallic wire.

23. The shopping cart of claim 22, wherein the cross-beam is welded to the first leg and the second leg and extends between the first leg and the second leg.

24. The shopping cart of claim 20, further comprising a first cover connected to the first arm of the first lower bracket and covering at least a portion of the first arm and a second cover connected to the first arm of the second lower bracket and covering at least a portion of the first arm, wherein the first and second covers each have a ramped surface facing toward a front of the shopping cart, such that the first and second covers are configured to engage and lift a rear end of a chassis of a second, identical shopping cart when the shopping cart is nested inside the second, identical shopping cart.

25. The shopping cart of claim 24, wherein the first and second covers are identical to each other.

* * * * *